Aug. 26, 1952  W. E. RENICK  2,608,214
RELIEF VALVE

Filed March 28, 1947  2 SHEETS—SHEET 1

INVENTOR.
WENDELL E. RENICK
BY Herschel C. Omohundro
Attorney

Aug. 26, 1952     W. E. RENICK     2,608,214
RELIEF VALVE

Filed March 28, 1947     2 SHEETS—SHEET 2

INVENTOR.
WENDELL E. RENICK
BY
Herschel C. Omohundro
attorney

Patented Aug. 26, 1952

2,608,214

UNITED STATES PATENT OFFICE 2,608,214

RELIEF VALVE

Wendell E. Renick, Grove City, Ohio, assignor to The Denison Engineering Company, Columbus, Ohio, a corporation of Ohio Application March 28, 1947, Serial No. 737,985

2 Claims. (Cl. 137—711)

This invention relates generally to hydraulic apparatus and is particularly directed to valve means for use in a hydraulic system to prevent the increase of pressure in such system beyond a predetermined maximum. More specifically, the invention is directed to improvements in a relief valve to secure smooth, even operation thereof and the avoidance of a rough, turbulent, or otherwise undesirable discharge from such valve when the same is operating to bypass fluid from the pressure section of a hydraulic system to the reservoir or low pressure section of the system.

An object of the invention is to provide a fluid pressure relief valve having a piston-operated, poppet type valve element which is responsive to fluid pressure to discharge fluid from a high pressure section of a hydraulic system to a low pressure section thereof, the valve being provided with means for eliminating turbulent flow in the discharge outlet of the relief valve.

A further object of the invention is to provide a relief valve having an internal chamber with inlet and outlet ports, the latter being separated from the chamber by a valve seat which cooperates with a valve element to control communication between the chamber and the outlet port, the valve element and the seat being so formed that fluid under pressure flowing between the valve element and the seat will be permitted to expand and dissipate its force before reaching the exhaust section or outlet port of the relief valve.

A further object of the invention is to provide a relief valve having a chamber with inlet and outlet ports and a valve seat insert between the chamber and the outlet port, such valve seat insert having a downwardly and outwardly inclined surface at the outlet side of the seat and to provide a valve element to cooperate with the insert to control communication between the chamber and the outlet port, the valve element having an extension which projects through the seat and cooperates with the downwardly and outwardly inclined surface thereof to form an annular passage of uniformly increasing diameter.

A still further object of the invention is to provide a relief valve having a chamber and inlet and outlet ports, the latter being separated from the chamber by a valve seat insert having a frusto-conical recess at the outlet side thereof, the relief valve being provided with a valve element having a head normally disposed in the frusto-conical recess of the insert and having a surface on the head disposed substantially in parallel relation with the surface of the chamber in the insert.

Further objects and advantages of the present invention will be apparent from the following description, reference being had to the accompanying drawings wherein a preferred form of embodiment of the invention is clearly shown.

Figure 2:
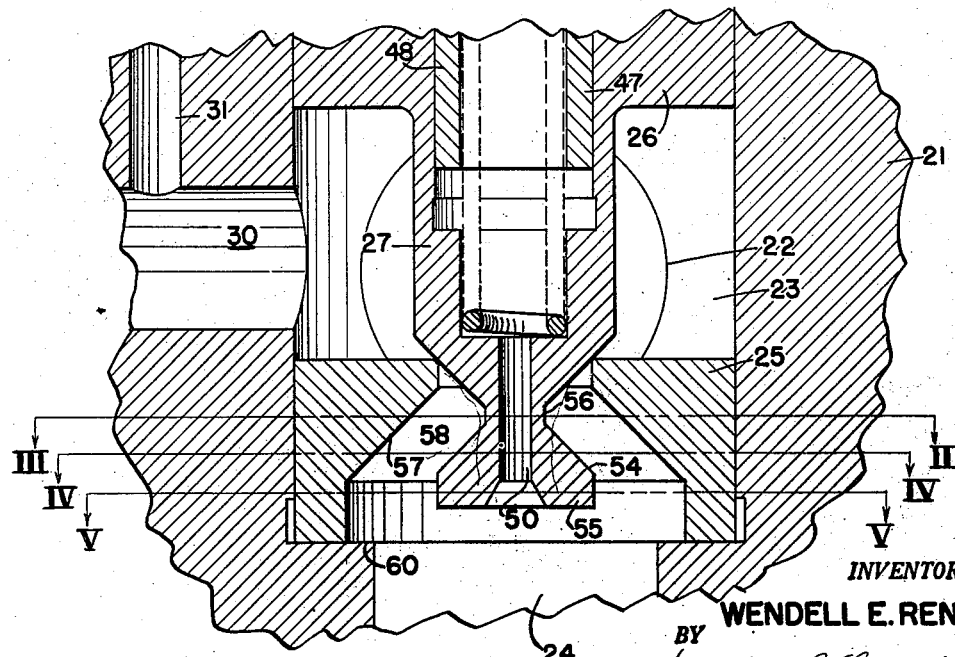
Fig. 2 is an enlarged detail sectional view of the portion of the valve in the vicinity of the valve element and the insert.
Figure 3:
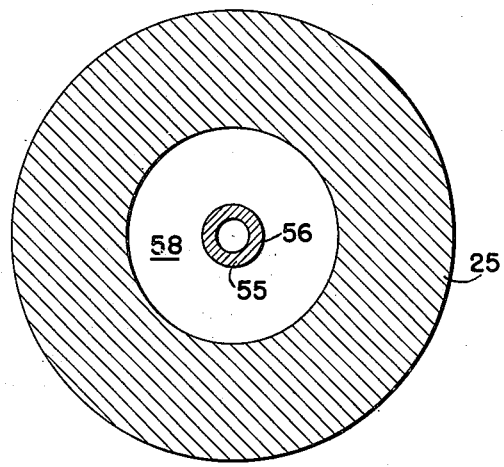
Figure 4:
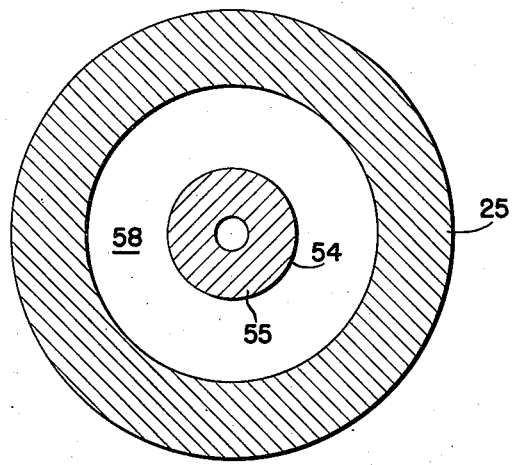
Figure 5:
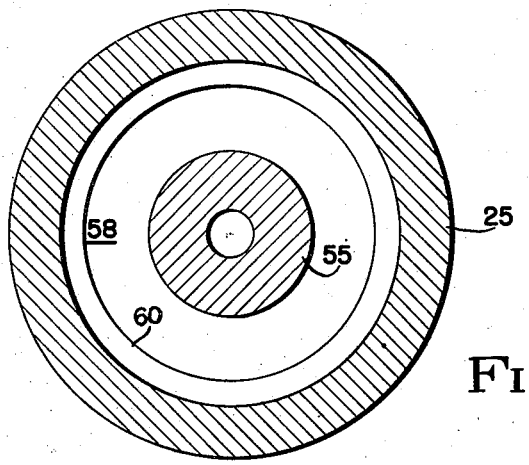

Figs. 3 to 5, inclusive, are detail horizontal sectional views taken on the planes indicated by the lines III—III, IV—IV, and V—V respectively of Fig. 2.

Referring more particularly to the drawings, the numeral 20 designates the complete valve. This valve has also been disclosed and parts claimed in my copending applications Serial Nos. 737,983 and 739,984 filed on March 28, 1947, the first of which now bears Patent No. 2,580,128. The valve 20 includes a body 21 having one or more inlet ports 22, an internal chamber 23, and an outlet port 24 leading from such chamber.

A valve seat insert 25 is positioned in the body 21 between the chamber 23 and the outlet 24. Chamber 23 receives a piston member 26 which has one end provided with an extension 27 bevelled as at 28 to provide a poppet type valve element, this valve element cooperating with insert 25 to control communication between chamber 23 and outlet 24. Piston 26 is operated by fluid pressure in the manner set forth in the above-mentioned application to engage valve 28 with and disengage the same from the insert 25. This operation will be briefly described here to facilitate the understanding of the invention.

To permit such operation body 21 is provided with a laterally extended passage 30 which communicates with the lower end of a vertical passage 31, this passage in turn connecting with an extension 32 thereof formed in a cap 33 secured by suitable means to the upper end of a body 21. Cap 33 has a longitudinal bore 34 formed therein for the reception of mechanism employed to control the operation of the relief valve. This mechanism is disclosed and claimed in copending application 737,983, now Patent No. 2,580,128, includes a second valve seat 35 and a cone-pointed valve 36 which is yieldably held in engagement with the seat 35 by a coil spring 37, this member being positioned between the valve 36 and an abutment member 40 disposed for sliding movement in the bore 34. This abutment member is engaged by an adjusting screw 41 by which the tension of the spring 37 may be adjusted. A guide element 42 is also positioned in the bore 34 between the seat 35 and the upper end of the passage extension 32; this guide element 42 slidably receives an elongated, valve-actuating piston 43 which is formed with a restricted passage 44 for establishing communication between the sections of the bore 34 at opposite ends of the guide 42. It will be noted that the diameter of the opening in the seat 35 is slightly smaller than the diameter of the piston 43; the purposes of this variation have been set forth in the above-mentioned copending application, now Patent 2,580,128.

Cap 33 is also provided with a second vertical passage 45 which extends from the space in bore 34 between guide 42 and seat 35 to the upper end of the chamber 23 above piston 26. A third passage 46 is provided in cap 33, this passage extending from the bore 34 at the outlet side of seat 35 to the interior of an auxiliary piston 47 which is telescopically positioned in piston 26, the auxiliary piston being yieldably urged into engagement with the under side of the cap 33 by a coil spring 48 contained within pistons 47 and 26. The interiors of the auxiliary piston and piston 26 are connected with the outlet port 24 by opening 50 formed in valve 28. Communication between the upper end of chamber 23 and the interior of the auxiliary piston 47 is precluded by a gasket ring 51 surrounding the enlarged upper end of the piston 47. This enlargement is provided to form a shoulder 52 which is exposed to the pressure in the upper end of chamber 23 to urge the piston in an upward direction. This auxiliary piston construction is also disclosed and claimed in copending application Serial No. 737,984.

Piston extension 27 has a projection 54 formed on its lower end beyond the valve 28, this projection forming a head 55 separated from the body of the extension 27 by a reduced neck 56, the upper surface of the head 55 is downwardly and outwardly inclined to provide the head with a frusto-conical formation. The under side 57 of the insert 25 is also inclined downwardly and outwardly to form a similarly shaped recess between the opening in the valve seat and the outlet port. The inclination of the surface 57 is such as to cause such surface to be substantially parallel to the opposed surface on the head 55. It will be noted from the drawing that the space between the opposed surfaces of the insert 25 and head 55 forms an annular passage 58 which increases in diameter as the lower end of the head 55 is approached, this increasing diameter permits fluid under pressure flowing through the opening in the valve seat to expand and dissipate its force prior to reaching the outlet port 24. After such fluid passes the head 55 it combines to form a solid stream which may flow through the outlet port 24; the combining of the fluid is assisted by an inwardly projecting shoulder 60 at the lower end of the insert, this shoulder being located between the frusto-conically shaped recess and the outlet port 24.

Figure 1:
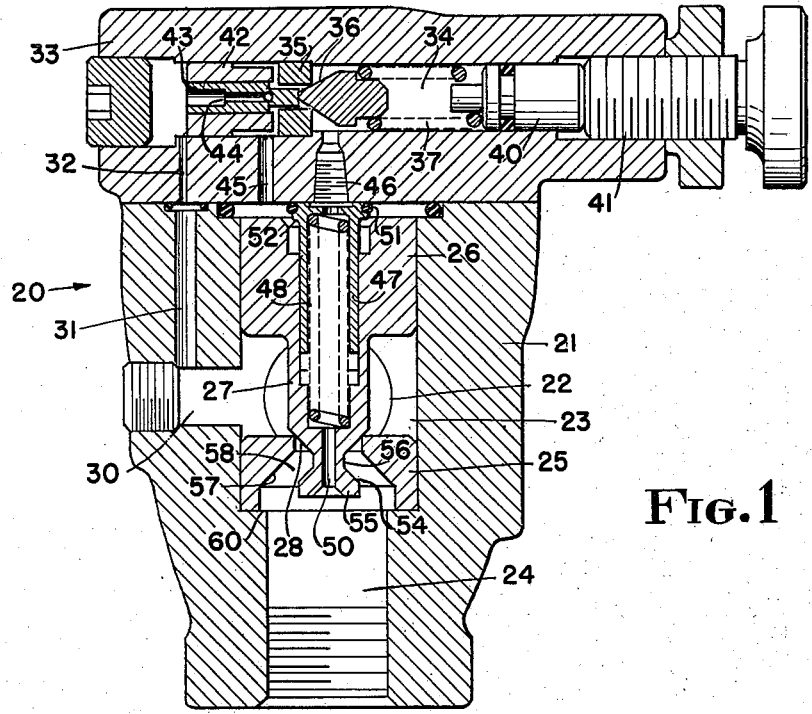
Fig. 1 is a vertical longitudinal sectional view taken through a valve formed in accordance with the present invention.

It will be apparent from Figs. 1 and 2 that when valve element 28 is spaced from seat 25 fluid may flow from the chamber 23 through the opening in the valve seat and be directed toward the reduced neck 56. This fluid will be redirected by the outwardly extending conical surface of the head 55 and, due to the increasing size of the annular passage, the force will be dissipated. When this fluid reaches the lower end of the insert it will be directed inwardly by the shoulder 60 to form a solid exhaust stream; this stream will be devoid of air bubbles and other turbulent tendencies. The manner in which valve 28 is moved from the seat 25 has been fully explained in the copending application and a repetition here is believed to be unnecessary.

While the form of embodiment of the present invention as herein disclosed constitutes a preferred form, it is to be understood that other forms might be adopted, all coming within the scope of the claims which follow.

I claim:

1. In a pressure relief valve; a body having a cylindrical chamber with an inlet port and outlet port at one end; an internal shoulder in said body between said chamber and said outlet port; a valve seat insert disposed in said chamber against said shoulder, said insert having an internal wall flaring downwardly and outwardly from said seat, said shoulder extending inwardly beyond the lower extremity of the internal wall of said insert; a valve member cooperating with the seat on said insert to control fluid flow from said chamber to said outlet port; and a frusto-conical extension on said valve member, said extension being disposed at the outlet side of said seat and having an exterior surface substantially parallel with the flaring wall of said insert, said extension terminating above said shoulder.

2. In a pressure relief valve; a body having a cylindrical chamber with an inlet port and an outlet port; an internal shoulder in said body between said chamber and said outlet port; an insert disposed in said chamber against said shoulder, said insert forming a central opening with a surrounding valve seat and a frusto-conical recess terminating in a cylindrical recess extension of greater diameter than the outlet passage formed by said internal shoulder; a valve member cooperating with said seat to control fluid flow from said chamber to said outlet port; and a frusto-conical head on said valve member, said head being disposed within said frusto-conical recess, the conical wall of said head being substantially parallel with the conical wall of said insert; said head having a cylindrical portion disposed in the cylindrical extension of said recess, said head terminating in spaced relation from said shoulder.

WENDELL E. RENICK.

REFERENCES CITED

The following references are of record in the file of this patent:

UNITED STATES PATENTS

| Number | Name | Date |
|---|---|---|
| 2,123,477 | Sheedy | July 12, 1938 |
| 2,237,554 | Grove | Apr. 8, 1941 |
| 2,388,820 | Bonnell | Nov. 13, 1945 |

FOREIGN PATENTS

| Number | Country | Date |
|---|---|---|
| 677,769 | Germany | July 3, 1939 |